(12) United States Patent
Abate et al.

(10) Patent No.: US 9,861,979 B2
(45) Date of Patent: Jan. 9, 2018

(54) INJECTION OF MULTIPLE VOLUMES INTO OR OUT OF DROPLETS

(75) Inventors: Adam Abate, San Francisco, CA (US); Sepehr Kiani, Watertown, MA (US); Tony Hung, Cambridge, MA (US); Pascaline Mary, Cambridge, MA (US); Adnan Moez Esmail, Boston, MA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 552 days.

(21) Appl. No.: 14/008,998

(22) PCT Filed: Mar. 28, 2012

(86) PCT No.: PCT/US2012/030811
§ 371 (c)(1),
(2), (4) Date: Oct. 15, 2014

(87) PCT Pub. No.: WO2012/135259
PCT Pub. Date: Oct. 4, 2012

(65) Prior Publication Data
US 2016/0045914 A1    Feb. 18, 2016

Related U.S. Application Data

(60) Provisional application No. 61/469,528, filed on Mar. 30, 2011.

(51) Int. Cl.
*B01L 3/00*       (2006.01)
*B01F 13/00*      (2006.01)
(Continued)

(52) U.S. Cl.
CPC ........ *B01L 3/5027* (2013.01); *B01F 13/0071* (2013.01); *B01F 13/0076* (2013.01);
(Continued)

(58) Field of Classification Search
None
See application file for complete search history.

(56) References Cited

U.S. PATENT DOCUMENTS

| 4,253,846 A | 3/1981 | Smythe et al. |
| 6,090,295 A | 7/2000 | Raghavarao et al. |

(Continued)

FOREIGN PATENT DOCUMENTS

| EP | 2364774 A2 | 9/2011 |
| EP | 2662135 A2 | 11/2013 |

(Continued)

OTHER PUBLICATIONS

International Search Report and Written Opinion from PCT/US2012/030811, dated Jul. 6, 2012.
(Continued)

*Primary Examiner* — Xiaoyun R Xu
(74) *Attorney, Agent, or Firm* — Kilpatrick Townsend and Stockton LLP

(57) ABSTRACT

The present invention generally pertains to a system for performing injection of multiple substantially controlled volumes into or out of a droplet, and methods and kits comprising the same. The system of the present invention comprises at least one microfluidic channel, one or more injection channels, an injection inlet associated with each of the one or more injection channels, and a mechanism for disrupting an interface between a droplet and a fluid and/or emulsion, wherein the at least one microfluidic channel comprises one or more droplets are flowing therein, and wherein each of the one or more injection channels comprises at least one fluid and/or emulsion therein.

8 Claims, 17 Drawing Sheets

System 100

(51) Int. Cl.
  *F04B 19/00* (2006.01)
  *F16K 99/00* (2006.01)
(52) U.S. Cl.
  CPC ...... *B01L 3/502784* (2013.01); *F04B 19/006* (2013.01); *F16K 99/0019* (2013.01); *B01L 2300/0816* (2013.01); *B01L 2300/0867* (2013.01); *B01L 2300/1861* (2013.01); *B01L 2400/0424* (2013.01); *B01L 2400/0436* (2013.01); *B01L 2400/0442* (2013.01)

(56) References Cited

U.S. PATENT DOCUMENTS

| | | |
|---|---|---|
| 6,524,456 B1 | 2/2003 | Ramsey et al. |
| 8,528,589 B2 | 9/2013 | Miller et al. |
| 8,535,889 B2 | 9/2013 | Larson et al. |
| 2003/0015425 A1 | 1/2003 | Bohm et al. |
| 2005/0196746 A1 | 9/2005 | Xu et al. |
| 2006/0163385 A1 | 7/2006 | Link et al. |
| 2007/0003442 A1 | 1/2007 | Link et al. |
| 2007/0227591 A1 | 10/2007 | Wissink et al. |
| 2008/0135411 A1* | 6/2008 | Whitehead ........ B01L 3/502784 204/547 |
| 2009/0012187 A1 | 1/2009 | Chu et al. |
| 2010/0163109 A1 | 7/2010 | Fraden et al. |
| 2011/0056575 A1 | 3/2011 | Hong et al. |
| 2011/0151578 A1 | 6/2011 | Abate et al. |
| 2011/0218123 A1 | 9/2011 | Weitz et al. |
| 2011/0250597 A1 | 10/2011 | Larson et al. |
| 2011/0267457 A1 | 11/2011 | Weitz et al. |
| 2012/0015822 A1 | 1/2012 | Weitz et al. |
| 2012/0132288 A1 | 5/2012 | Weitz et al. |
| 2012/0219947 A1 | 8/2012 | Yurkovetskty et al. |
| 2012/0220494 A1 | 8/2012 | Samuels et al. |
| 2012/0222748 A1 | 9/2012 | Weitz et al. |
| 2012/0309002 A1 | 12/2012 | Link |
| 2014/0354795 A1 | 12/2014 | Tracy et al. |

FOREIGN PATENT DOCUMENTS

| | | |
|---|---|---|
| JP | 2006-523142 A | 10/2006 |
| WO | 2004/103565 A2 | 12/2004 |
| WO | 2007/081385 A2 | 7/2007 |
| WO | 2007/081387 A1 | 7/2007 |
| WO | 2009-050512 A2 | 4/2009 |
| WO | 2009/120254 A1 | 10/2009 |
| WO | 2010/128157 A1 | 11/2010 |
| WO | 2010/151776 A2 | 12/2010 |
| WO | 2012/078710 A1 | 6/2012 |
| WO | 2012/135201 A1 | 10/2012 |
| WO | 2012/135327 A1 | 10/2012 |
| WO | 2013/095737 A2 | 6/2013 |
| WO | 2013/122826 A1 | 8/2013 |
| WO | 2013/165748 A1 | 11/2013 |
| WO | 2014/043388 A1 | 3/2014 |
| WO | 2014/093976 A1 | 6/2014 |
| WO | 2014/117088 A1 | 7/2014 |
| WO | 2014/176599 A1 | 10/2014 |

OTHER PUBLICATIONS

U.S. Appl. No. 14/290,867, filed May 29, 2014.
U.S. Appl. No. 14/470,860, filed Aug. 27, 2014.
U.S. Appl. No. 14/502,948, filed Sep. 30, 2014.
Extended European Search Report from EP Application No. 12762825.3, dated Jul. 24, 2015.

* cited by examiner

System 100

System 250

INJECTION OF MULTIPLE VOLUMES INTO OR OUT OF DROPLETS

RELATED APPLICATIONS AND INCORPORATION BY REFERENCE

This application is a national phase application under 35 USC §371 of PCT Application No. PCT/US2012/030811 filed Mar. 28, 2012, which claims the benefit of priority to U.S. provisional patent application Ser. No. 61/469,528 filed Mar. 30, 2011, the teaching and contents of which are hereby incorporated by reference.

The foregoing application, and all documents cited therein or during its prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

The present invention is in the technical field of microfluidics. More particularly, the present invention relates to a microfluidic device and method for injection of multiple volumes into or out of droplets.

BACKGROUND OF THE INVENTION

Microfluidic processes may use droplets as reaction vessels for performing chemical or biological reactions. In such processes, often referred to as droplet microfluidics, the required reagents must be encapsulated in the droplets and processed by microfluidic devices as needed for the reaction to take place. In many applications, several volumes must be combined in a specific sequence. Existing methods attempt to achieve this result by separately emulsifying a plurality of volumes, interdigitating droplets, and bringing the droplets into contact such that the droplets may coalesce to combine the volumes. However, while droplet coalescence has been demonstrated for pairs of droplets, the process is difficult to control and does not work reliably.

Injection is a microfluidic process whereby a volume is introduced into a droplet by flowing it past a pressurized channel that is triggered to inject volume into the droplet using an electric field. One disadvantage of injection, however, is that it can only add one fluid at a time into a droplet. Thus, when additional volumes are required to be added into a droplet, additional picoinjectors must be used, each of which requires that the droplets be spaced periodically, and that the electrodes and other supporting components be fabricated on the microfluidic device. Hence, traditional microfluidic devices that employ injection are complex, inefficient spacewise and difficult to both operate and control.

Accordingly, there is a need for a system for performing injection of multiple substantially controlled volumes into or out of droplets that is streamlined, compact and easy to operate and control.

The present invention provides a system, method and kit for performing injection of multiple substantially controlled volumes into or out of droplets.

Citation or identification of any document in this application is not an admission that such document is available as prior art to the present invention.

SUMMARY OF THE INVENTION

The present invention generally pertains to a system for performing injection of multiple substantially controlled volumes into or out of droplets. The system may comprise a microfluidic channel through which droplets flow, one or more injection channels which may comprise one or more fluids and/or emulsions, and an injection inlet which may be associated with each injection channel. The microfluidic channel may intersect with the injection inlet associated with each of the one or more injection channels, such that each injection inlet, and the fluid and/or emulsion within each respective injection channel, may be connected to the microfluidic channel at a region referred to as an injection interface. In one embodiment, each injection channel may further comprise one or more subchannels, wherein each subchannel may comprise a fluid and/or emulsion, and wherein each subchannel may intersect with the microfluidic channel at the respective injection inlet associated with the injection channel comprising the particular subchannel, and wherein each subchannel may communicate with the microfluidic channel at an injection interface. The system of the invention may further comprise a mechanism for disrupting at least a portion of the interface between a fluid or emulsion in an injection channel and a droplet flowing in a microfluidic channel, which may result in injection of a relatively controlled volume either into or out of a droplet and, hence, a respective increase or decrease in volume of the droplet relative to prior to injection. Accordingly, as droplets flow through the microfluidic channel, substantially controlled volumes may be either injected into or out of each droplet by way of each injection inlet associated with each of the one or more injection channels.

The present invention also pertains to a method for injection of multiple substantially controlled volumes into or out of droplets. In one embodiment, the method may comprise the use of a system comprising a microfluidic channel through which droplets flow, one or more injection channels comprising one or more fluids and/or emulsions, and an injection inlet associated with each injection channel. The microfluidic channel may intersect with the injection inlet associated with each of the one or more injection channels, such that each injection inlet, and the fluid and/or emulsion within each respective injection channel, may be connected to the microfluidic channel at a region referred to as an injection interface. In one embodiment, each injection channel may further comprise one or more subchannels, wherein each subchannel may comprise a fluid and/or emulsion, and wherein each subchannel may intersect with the microfluidic channel at the respective injection inlet associated with the injection channel which may comprise the particular subchannel, and wherein each subchannel may communicate with the microfluidic channel as an injection interface. The system of the invention may further comprise a mechanism for disrupting at least a portion of the interface between a fluid or emulsion in an injection channel and a droplet flowing in a microfluidic channel, which may result in injection of a relatively controlled volume either into or out of a droplet and, hence, a respective increase or decrease in volume of the droplet relative to prior to injection. Accordingly, as droplets flow through the microfluidic channel, substantially controlled volumes may be either injected into or out of each droplet by way of each injection inlet associated with each of the one or more injection channels.

The present invention also pertains to a kit containing the system and reagents necessary for performing injection of multiple substantially controlled volumes into or out of droplets. In one embodiment, the kit may comprise a system which may comprise a microfluidic channel through which droplets flow, one or more injection channels which may comprise one or more fluids and/or emulsions, and an injection inlet which may be associated with each injection channel. The microfluidic channel may intersect with the injection inlet which may be associated with each of the one or more injection channels, such that each injection inlet, and the fluid and/or emulsion within each respective injection channel, may be connected to the microfluidic channel at a region referred to as an injection interface. In one embodiment, each injection channel may further comprise one or more subchannels, wherein each subchannel may comprise a fluid and/or emulsion, and wherein each subchannel may intersect with the microfluidic channel at the respective injection inlet associated with the injection channel which may comprise the particular subchannel, and wherein each subchannel may communicate with the microfluidic channel as an injection interface. The system of the invention may further comprise a mechanism for disrupting at least a portion of the interface between a fluid or emulsion in an injection channel and a droplet flowing in a microfluidic channel, which may result in injection of a relatively controlled volume either into or out of a droplet and, hence, a respective increase or decrease in volume of the droplet relative to prior to injection. Accordingly, as droplets flow through the microfluidic channel, substantially controlled volumes may be either injected into or out of each droplet by way of each injection inlet associated with each of the one or more injection channels. The kit according to this embodiment may further comprise the reagents necessary for performing injection of substantially controlled volumes into or out of each droplet using the system described herein.

Accordingly, it is an object of the invention to not encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. §112, first paragraph) or the EPO (Article 83 of the EPC), such that Applicants reserve the right and hereby disclose a disclaimer of any previously described product, process of making the product, or method of using the product.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings.

DETAILED DESCRIPTION OF THE INVENTION

Figure 1:
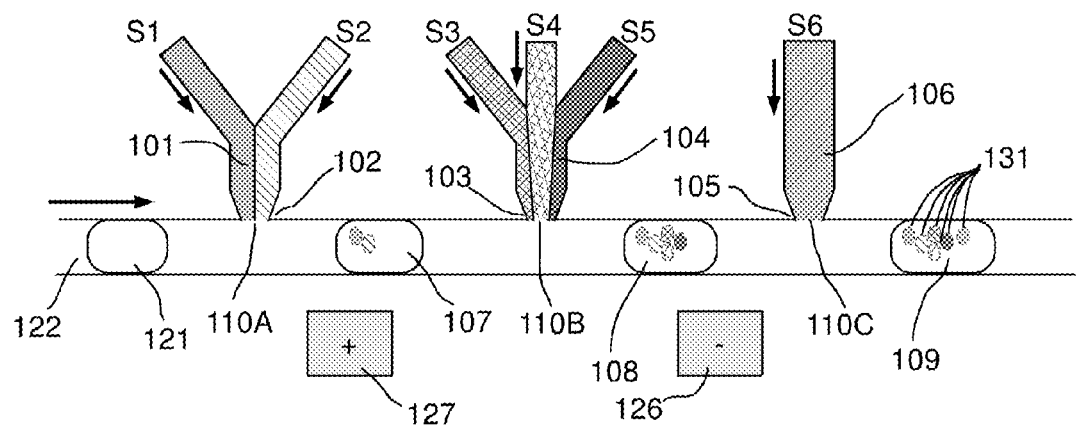
FIG. 1 is an illustration of an example of one embodiment of a system for performing injection of multiple substantially controlled volumes into or out of a droplet, according to the present invention.

The present invention generally pertains to a system for performing injection of multiple substantially controlled volumes into or out of a droplet, and methods and kits comprising the same. The system of the present invention comprises a microfluidic channel through which droplets flow by being acted upon by a source of positive or negative pressure, e.g., a pressurized or evacuated air reservoir, syringe pump, gravity or centripetal forces, wherein the pressure source comprises any fluid or combinations of fluids, including but not limited to, any gas or combination of gases (e.g., air, nitrogen, carbon dioxide, argon, and so forth) or any liquid or combinations of liquids (e.g., water, buffer, oil, and so forth), such that the droplets flow or stream through a microfluidic channel and are herein referred to as "flowing droplets" or "streaming droplets".

The system further comprises one or more injection channels comprising one or more fluids and/or emulsions, and an injection inlet associated with each injection channel. The microfluidic channel intersects with the injection inlet associated with each of the one or more injection channels, such that the injection inlet, and the fluid and/or emulsion within the respective injection channel, is connected to the microfluidic channel at a region referred to as an injection interface. In one embodiment, each injection channel may further comprise one or more subchannels, wherein each subchannel comprises a fluid and/or emulsion, and wherein each subchannel intersects with the microfluidic channel at the respective injection inlet associated with the injection channel comprising the particular subchannel, and wherein each subchannel communicates with the microfluidic channel at an injection interface.

A "fluid", as used herein, is any aqueous or lipophilic phase capable of flowing freely. Two or more fluids may flow in a manner referred to as "co-flowed" such that the flow of each fluid is laminar in the same direction within the range or timescale of the operation of the system but such that they are not substantially mixing. The fluid and/or emulsion injected into or out of a droplet may further comprise one or more reagents, reaction components or samples of interest selected from cells (including any eukaryotic or prokaryotic cells, including but not limited to cells selected from humans, animals, plants, fungi, bacteria, viruses, protozoa, yeasts, molds, algae, rickettsia, and prions); proteins, peptides, nucleic acid sequences, oligonucleotide probes, polymerase enzymes, buffers, dNTPs, organic and inorganic chemicals, and fluorescent dyes.

A "droplet", as used herein, means an isolated aqueous or lipophilic phase within a continuous phase having any shape, for example but not limited to, cylindrical, spherical and ellipsoidal, as well as flattened, stretched or irregular shapes and so on. One or more droplets according to the present invention may be used to perform various functions, including but not limited to, serving as reaction vessels for performing chemical reactions; collectively encompassing a library of elements, including but not limited to a library of oligonucleotide probes; or as lenses for focusing a laser for optical applications. In one embodiment of the invention, one or more droplets are contained within an emulsion. In another embodiment of the invention, one or more droplets are contained within an emulsion in a microfluidic device.

An "emulsion", as used herein, is a stable mixture of at least two immiscible or partially immiscible liquids. In general, immiscible liquids tend to separate into two distinct phases. Accordingly, a surfactant may be added to stabilize the emulsion by reducing surface tension between the at least two immiscible or partially immiscible liquids and/or to stabilize the interface. For example, an emulsion according to the systems, methods and kits of this invention may comprise a plurality of aqueous droplets in an immiscible oil, such as fluorocarbon oil, silicon oil or hydrocarbon oil (including, but not limited to, petroleum and mineral oil) where the droplet size ranges from about 0.5 to about 5000 microns in diameter.

In one embodiment of the invention, one or more droplets are contained within an emulsion in a microfluidic channel within a microfluidic device. A "microfluidic device", as used herein, is a device that enables a means of effecting a deterministic function on liquid or gas fluids at small scales typically measured in volumes such as, for example, milliliter (mL), microliter (μL), nanoliter (nL), picoliter (pL), or femtoliter (fL) volumes and/or by physical scale such as millimeter (mM), micrometer (μm), nanometer (nm), picometer (pm), or femtometer (fm). Functions can include mixing, splitting, sorting, heating, and so forth. Microfluidic devices may comprise microfluidic channels as a means for transferring droplets, fluids and/or emulsions from one point to another point and are typically of uniform cross section in the mm, μm or nm scale.

In one or more embodiments of the present invention, the volume injected into or out of each droplet may be any suitable amount, depending on the embodiment, as will be appreciated and understood by one of skill in the art. For example, the volume injected into or out of each droplet may be less than about 10 μL, less than about 1 μL, less than about 100 nL, less than about 10 nL, less than about 1 nL, less than about 100 pL, less than about 10 pL, less than about 1 pL, less than about 100 fL, less than about 10 fL, less than about 1 fL and so forth.

In one or more embodiments of the present invention, the injection inlet may be of any shape, including but not limited to, circular, elliptical, triangular, rectangular and so forth. The injection inlet may have an average cross-sectional dimension of less than about 100 μm, less than about 10 μm, less than about 1 μm, less than about 100 nm, less than about 10 nm, less than about 100 pm, less than about 10 pm, less than about 1 pm, less than about 100 fm, less than about 10 fm, less than about 1 fm and so forth. The injection inlet may be flush with the microfluidic channel or, alternatively, may protrude into the microfluidic channel.

The system further comprises a mechanism for disrupting at least a portion of the interface between a droplet flowing in a microfluidic channel and a fluid and/or emulsion in an injection channel, resulting in injection of a relatively controlled volume either into or out of a droplet and, hence, a respective increase or decrease in the volume of the droplet relative to prior to injection. An "interface", as used herein when referring to the interface between a droplet and a fluid and/or emulsion, is one or more region where two immiscible or partially immiscible phases (e.g., a droplet and a fluid or emulsion) are capable of interacting with each other. Upon disruption of the interface, there is a relative flow of volume either from the injection channel and into the droplet or out of the droplet and into the injection channel, all via the injection inlet associated with the particular injection channel. As the droplet continues to flow past the injection inlet, there is a shearing force that breaks the contact between the droplet and the fluid and/or emulsion, followed by restoration of the interface and end of volume flow between the droplet and the fluid and/or emulsion.

The direction and rate of volume may be controlled by controlling various factors of the droplets, fluids, emulsions, and/or system components, including but not limited to, the mechanism of disrupting the interface between the droplet and the fluid and/or emulsion (discussed further below); the curvature and/or velocity of the droplet; the pressure in the injection channel and/or the microfluidic channel relative to one another; the surface tension of the droplet; the surface tension of the fluid and/or emulsion; the geometry of the injection inlet, and so forth as will be known and appreciated by one of skill in the art. The above factors may, in some instances, result in forces acting on the system of the present invention, as described below.

For example, the injection inlet should be constructed such that the pressure of the system may be balanced to substantially prevent the fluid and/or emulsion in the injection channel from flowing into the microfluidic channel unless there is a droplet present in the microfluidic channel and in direct contact with an injection interface, and there is sufficient activation energy to foster injection of volume between the droplet in the microfluidic channel and the fluid and/or emulsion in an injection channel. Accordingly, when there is no droplet in direct contact with an injection interface or, in instances where there is a droplet in direct contact with an injection interface but there is no mechanism for disrupting the interface between the droplet and a fluid and/or emulsion, there is substantially no net positive or net negative flow of volume into or out of the droplet or into or out of an injection channel because the forces pushing volume out of an injection channel and into the droplet are substantially balanced by the forces pushing volume out of the droplet and into the injection channel. Accordingly, the system of the present invention is constructed to substantially prevent dripping of fluid and/or emulsion from the injection channel into the microfluidic channel when there is no droplet in direct contact with an injection interface or, in instances where there is a droplet in direct contact with an injection interface but there is no mechanism for disrupting the interface between the droplet and a fluid and/or emulsion.

The mechanism for disrupting the interface between a droplet and a fluid and/or emulsion may be selected from any passive or active method, or combinations thereof, known and appreciated by one of skill in the art. Xu, et al., "Droplet Coalescence in Microfluidic Systems", *Micro and Nanosystems* (2011) vol. 3, no. 2, pp. 131-136, the entirety of which is incorporated herein by reference, describes many interface disruption mechanisms in the context of droplet coalescence but the same apply for injection of multiple substantially controlled volumes into or out of a droplet, as will be known, understood and appreciated by one of skill in the art.

Passive methods for disrupting the interface do not require external energy and rely primarily on the structure and surface properties of the microfluidic channel and associated injection channels and respective injection inlets. Passive methods for disrupting the interface include, but are not limited to, flow trapping and surface modification, which are further described by Xu, et al. and will be known and appreciated by one of skill in the art.

Examples of passive methods for disrupting the interface include, but are not limited to, the use of a localized hydrophilic region in a microfluidic channel, wherein the microfluidic channel comprises hydrophobic walls and contains aqueous-based droplets in a continuous oil phase flowing therein. The hydrophobic walls of the microfluidic channel prevent wetting of droplets and promote the presence of a thin layer of the continuous phase between the droplets and the microfluidic channel surface. However, when the microfluidic further comprises a localized region that is relatively hydrophilic, wetting of the droplets occurs as they flow pass this localized region, resulting in disruption of the previously stable interface and injection of fluid and/or emulsion either into or out of the droplet. Once the droplets flow past this localized region, the continuous phase will naturally re-wet the microfluidic channel wall and, thus, promote reformation and stabilization of the interface between the droplets and the fluid and/or emulsion. A localized hydrophilic region may be created in a hydrophobic microfluidic channel by various methods known and appreciated by one of skill in the art, including but not limited to, constructing the microfluidic channel with a material having surface chemistry that may be initiated with ultraviolet (UV) light, such that shining UV light to the localized region will induce said surface chemistry resulting in a change in the material surface property of the region from relatively hydrophobic to relatively hydrophilic.

Other examples of passive methods for disrupting the interface include creating posts or other disruptions in the path of the droplet intended to increase the shear forces on the droplet as it passes through a particular region of the microfluidic channel, or, alternatively, incorporating valves into or deformations in the walls of the microfluidic channel to physically trap a droplet to promote destabilization of at least a portion of the interface. Each of these methods results in a relatively unstable interface which, as described above, reforms and stabilizes once the droplet passes the region of disruption.

Active methods for disrupting the interface require energy generated by an external field. Active methods for disrupting the interface include, but are not limited to, electrocoalescence (i.e., by applying an electric field through the use of, e.g., one or more pairs of electrodes) and dielectrophoresies (DEP), temperature and pneumatically actuated methods, including the use of lasers and acoustic pressure methods, many of which are described by Xu, et al. and will be known and appreciated by one of skill in the art.

Examples of active methods for disrupting the interface include, but are not limited to, changing the temperature in a localized region of the system, resulting in temperature-dependent viscosity and surface tension changes affecting disruption of the interface between a droplet and a fluid and/or emulsion. For example, a laser may be focused (in the form of a "laser spot") on a region of the microfluidic channel where the droplets intersect with an injection inlet, particularly encompassing an injection interface. Such spatial variation in temperature around the laser spot will promote spatial imbalance of droplet surface tension, resulting in a thermocapillary effect on and, hence, destabilizing of, the interface. In another example, acoustic pressure waves may be used to disrupt the surface of a droplet, change the wettability of a droplet or manipulate the position of a droplet. As with methods discussed previously, each of these methods results in a relatively unstable interface which, as described above, reforms and stabilizes once the droplet passes the region of disruption.

In one or more embodiments of the present invention, the mechanism for disrupting the interface between a droplet and a fluid and/or emulsion fluid is selected from at least one pair of electrodes. In such embodiments, the at least one pair of electrodes may be positioned substantially orthogonal to the microfluidic channel. In some aspects of one or more embodiments, the at least one pair of electrodes may be positioned substantially opposite to one or more injection channel. The at least one pair of electrodes applies an electric field to one or more injection inlet of one or more injection channel. In some examples, the at least one pair of electrodes may be positioned such that the electrodes create an electric field maximally located within one or more injection inlet or at least proximate to an injection inlet.

In embodiments wherein at least one pair of electrodes is utilized as a mechanism for disrupting the interface between a droplet and a fluid and/or emulsion as described above, the electrodes may be positioned in a variety of configurations relative to other components of the system. For example, a first electrode and a second electrode of at least one pair of electrodes may be positioned above or below the microfluidic channel. In some instances, a first electrode and a second electrode of at least one pair of electrodes may be positioned essentially on opposite sides of the microfluidic channel. In other instances, a first electrode and a second electrode of at least one pair of electrodes may be positioned essentially on opposite sides of both the microfluidic channel and one or more injection channels. In yet other instances, a first electrode and a second electrode of at least one pair of electrodes may be positioned such that a plane intersects both electrodes. In still other instances, a first electrode and a second electrode of at least one pair of electrodes may be positioned to be co-planar with the microfluidic channel and/or co-planar with one or more injection channel and/or co-planar with one or more injection inlet, such that the electrodes are positioned such that a plane intersects with each of these. In still another aspect of this embodiment, only one of the electrodes in a particular pair of electrodes needs to be localized. For example, a large ground plane may serve many individual, localized electrodes. In another example, a continuous phase fluid may serve as one of the electrodes in a pair.

The electrodes may be fabricated from any suitable material, which will be understood and appreciated by one of skill in the art. For example, the electrodes may be fabricated from materials including, but not limited to, metals, metalloids, semiconductors, graphite, conducting polymers, and liquids, including but not limited to ionic solutions, conductive suspensions, liquid metals, and so forth. The electrodes may have any shape suitable for applying an electric field, as will be understood and appreciated by one of skill in the art. For example, an electrode may have an essentially rectangular shape. In this example, the electrode may be elongated and have a tip defined as a region of the electrode closest to an intersection between the microfluidic channel and one or more injection channels. The electrode tip is constructed such that an electric field maximum is created in said intersection or substantially proximate the intersection as described previously.

In some examples where more than one pair of electrodes is employed, the electrodes may be constructed to minimize interference between one or more electrodes and one or more injection channels, for example, by minimizing the unintended exposure of a first interface to an electric field by an electrode intended to expose a second interface positioned in a different location than the first interface to an electric field. In some aspects, this may be accomplished by reducing the size of the electrode tip to allow more focused application of an electric field by the electrode tip such that one or more interfaces are not unintentionally exposed to the electric field, and/or are exposed to relatively lower electric field strengths. In other aspects, the region comprising an injection channel and respective injection inlet may be modified, e.g., by adding dimension in the form of a small bump or other modification for the purpose of localizing and strengthening the electric field in that around an injection inlet. Such aspects of the present invention may be advantageous, for example, in instances where it is desired to reduce the distance between multiple microfluidic channels, each associated with multiple injection channels and respective injection inlets as part of a microfluidic device.

Referring now to FIG. 1, wherein an example of one embodiment of a system for performing injection of multiple substantially controlled volumes into or out of a droplet, according to the present invention, is illustrated. In this example, the system 100 comprises a pair of electrodes 126-127 as a mechanism for disrupting the interface between a droplet and a fluid and/or emulsion. However, any of the mechanisms for disrupting the interface between a droplet and a fluid and/or emulsion described previously may be used in place of a pair of electrodes as alternative aspects or embodiments of the system illustrated in this or any other figure disclosed herein. The pair of electrodes 126-127 comprises a negative electrode 126 and a positive electrode 127, each on substantially the same side of a microfluidic channel 122.

The system 100 further comprises: a first injection channel 101 comprising two co-flowed fluids (or, alternatively, emulsions) S1 and S2 and a first injection inlet 102; a second injection channel 104 comprising three co-flowed fluids (or, alternatively, emulsions) S3, S4 and S5 and a second injection inlet 103; and a third injection channel 106 comprising one fluid (or, alternatively, emulsion) S6 and a third injection inlet 105. Each injection channel 101, 104 and 106 comprises an injection inlet (102, 103 and 105, respectively) connected to the microfluidic channel 122 across an injection interface (first interface 110A, second interface 110B and third interface 110C, respectively). The injection channels 101, 104 and 106 of the system 100 are on substantially the same side of the microfluidic channel 122 relative to each other and on substantially the opposite side of the microfluidic channel relative to the pair of electrodes 126-127. When there is no droplet present in the microfluidic channel 122 at one or more of the injection interfaces 110A, 110B and 110C, there is practically or substantially no flow of volume of fluid (or emulsion) from each injection channel 101, 104 and 106 via each respective injection inlet 102, 103 and 105 into the microfluidic channel 122.

In the example illustrated in FIG. 1, a droplet 121 is flowing through a microfluidic channel 122 in the direction indicated. As the droplet 121 flows past the first injection inlet 102 of the first injection channel 101, a substantially controlled volume of each of co-flowed fluids S1 and S2 are injected and sheared off into the droplet 121, resulting in droplet 107. As droplet 107 flows past the second injection inlet 103 of the second injection channel 104, a substantially controlled volume of each of co-flowed fluids S3, S4 and S5 is injected into the droplet 107, resulting in droplet 108. As droplet 108 flows past the third injection inlet 105 of the third injection channel 106, a substantially controlled volume of fluid S6 is injected and sheared off into droplet 108, resulting in droplet 109. The shape and design characteristics of the injected volumes 131 are used in FIG. 1 solely to illustrate the differentiation of the individual injected volumes from the original content of the droplet, as after injection of a substantially controlled volume into a droplet, practically or substantially no partition or boundary exists between the droplet and the injected volume. The method performed by the system 100, as illustrated in this example, may be modified to provide for the alternative method of the injection of a substantially controlled volume out of at least one droplet, as described previously. Accordingly, the system 100 illustrated and described in this example is capable of performing injection of multiple substantially controlled volumes into or out of a droplet.

Figure 2:
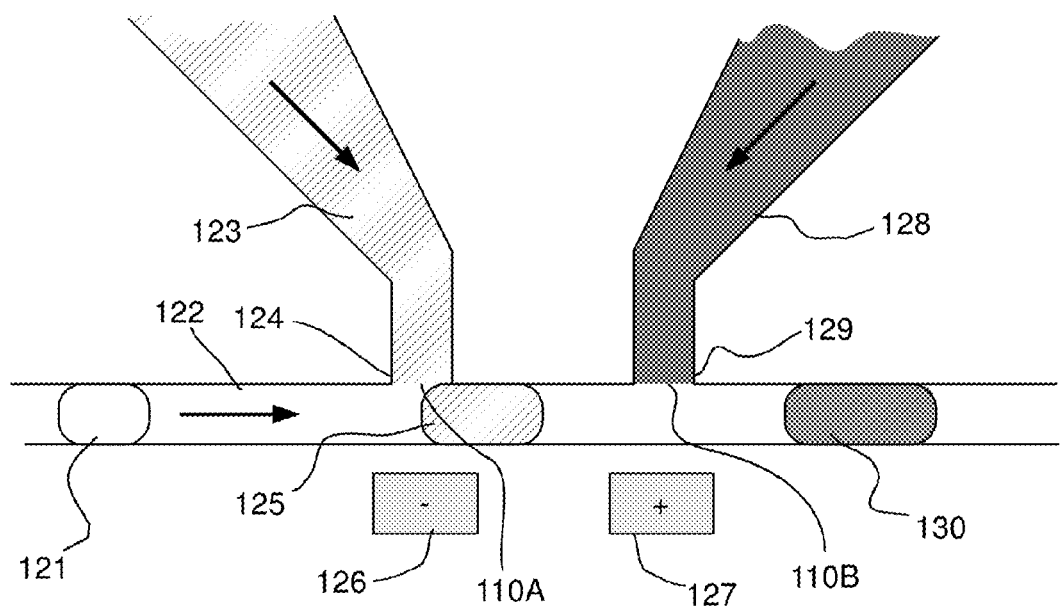
FIG. 2 is an illustration of an example of another embodiment of a system for performing injection of multiple substantially controlled volumes into or out of a droplet, according to the present invention.

Referring now to FIG. 2, wherein an example of one embodiment of a system for performing injection of multiple substantially controlled volumes into or out of a droplet, according to the present invention, is illustrated. In this example, the system 2-120 comprises a pair of electrodes 126-127 as a mechanism for disrupting the interface between a droplet and a fluid and/or emulsion. However, any of the mechanisms for disrupting the interface between a droplet and a fluid and/or emulsion described previously may be used in place of a pair of electrodes as alternative aspects or embodiments of the system illustrated in this or any other figure disclosed herein. The pair of electrodes 126-127 comprises a negative electrode 126 and a positive electrode 127 substantially opposed to each other and on substantially opposite sides of a microfluidic channel 122.

The system 2-120 further comprises a first injection channel 123 comprising a fluid (or, alternatively, an emulsion) therein flowing in the direction indicated, and a first injection inlet 124; and a second injection channel 128 comprising a fluid (or, alternatively, an emulsion) therein flowing in the direction indicated, and a second injection inlet 129. Each injection channel 123 and 128 comprises an injection inlet (124 and 129, respectively) connected to the microfluidic channel 122 across an injection interface (first injection interface 110A and second injection interface 110B, respectively). The first injection channel 123 and second injection channel 128 are disposed on substantially the same side of the microfluidic channel 122, and the first injection inlet 124 and second injection inlet 129 are is connected to the microfluidic channel 122.

In the example illustrated in FIG. 2, a droplet 121 is flowing through a microfluidic channel 122 in the direction indicated. As droplet 121 flows past the first injection inlet 124 of the first injection channel 123, a substantially controlled volume of fluid is injected into droplet 121, resulting in droplet 125. As droplet 125 flows past the second injection inlet 129 of the second injection channel 128, a substantially controlled volume of fluid is injected into droplet 125, resulting in droplet 130. The method performed by the system 2-120, as illustrated in this example, may be modified to provide for the alternative method of the injection of a substantially controlled volume out of at least one droplet, as described previously. Accordingly, the system 2-120 illustrated and described in this example is capable of performing injection of multiple substantially controlled volumes into or out of a droplet.

Figure 3:
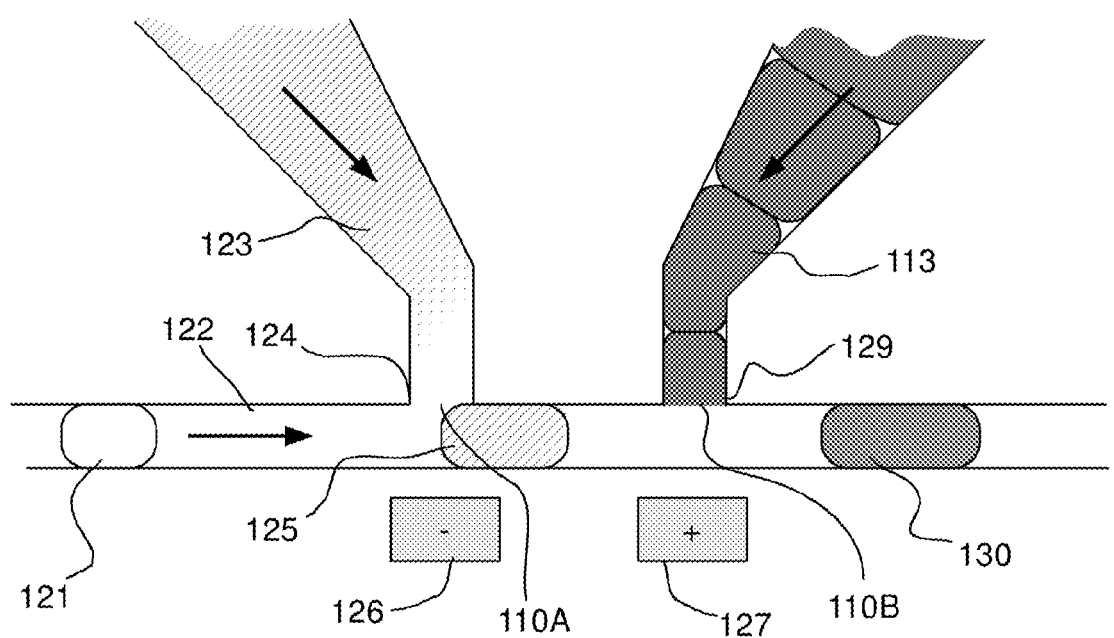
FIG. 3 is an illustration of an example of another embodiment of a system for performing injection of multiple substantially controlled volumes into or out of a droplet, according to the present invention.

FIG. 3 is an example of an alternative embodiment of the system illustrated in FIG. 2, wherein an emulsion is expressly illustrated in at least one injection channel (second injection channel 113 in this example). The method performed by the system 3-120, as illustrated in this example, may be modified to provide for the alternative method of the injection of a substantially controlled volume out of at least one droplet, as described previously. Accordingly, the system 3-120 illustrated and described in this example is capable of performing injection of multiple substantially controlled volumes into or out of a droplet.

Figure 4:
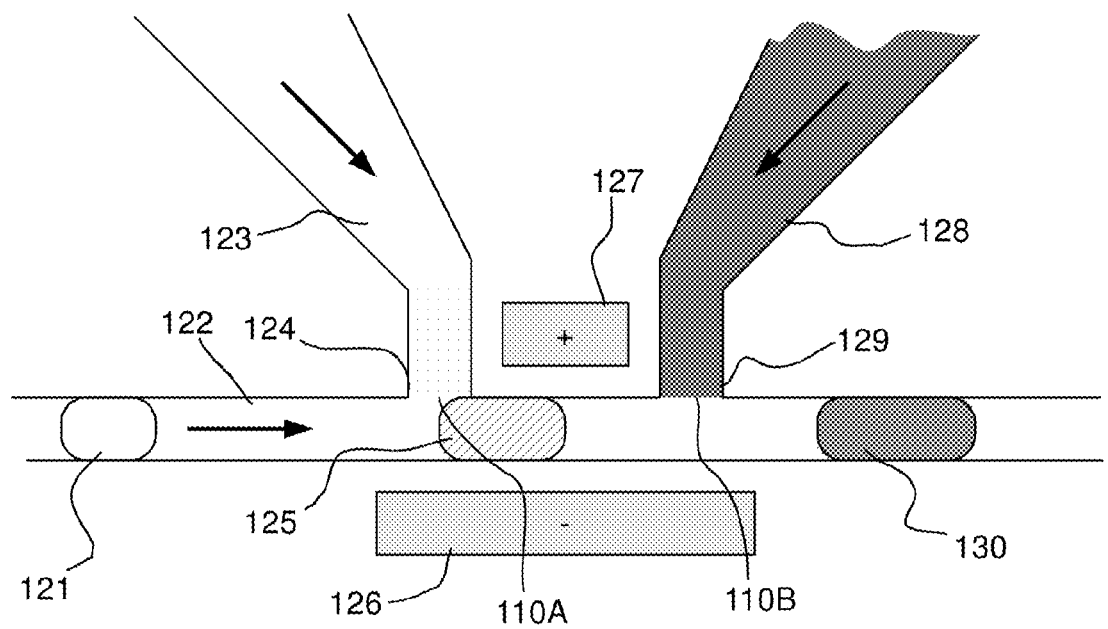
FIG. 4 is an illustration of an example of another embodiment of a system for performing injection of multiple substantially controlled volumes into or out of a droplet, according to the present invention.

FIG. 4 illustrates a system 4-120, which is an example of an alternative embodiment of the system 2-120 illustrated in FIG. 2, wherein each electrode of the pair of electrodes 126-127 is present on substantially opposite sides of the microfluidic channel 122 and substantially opposite to each other, and wherein one electrode (positive electrode 127 in this example) of the pair of electrodes 126-127 is substantially in between first injection channel 123 and second injection channel 128. The method performed by the system 4-120, as illustrated in this example, may be modified to provide for the alternative method of the injection of a substantially controlled volume out of at least one droplet, as described previously. Accordingly, the system 4-120 illustrated and described in this example is capable of performing injection of multiple substantially controlled volumes into or out of a droplet.

Figure 5:
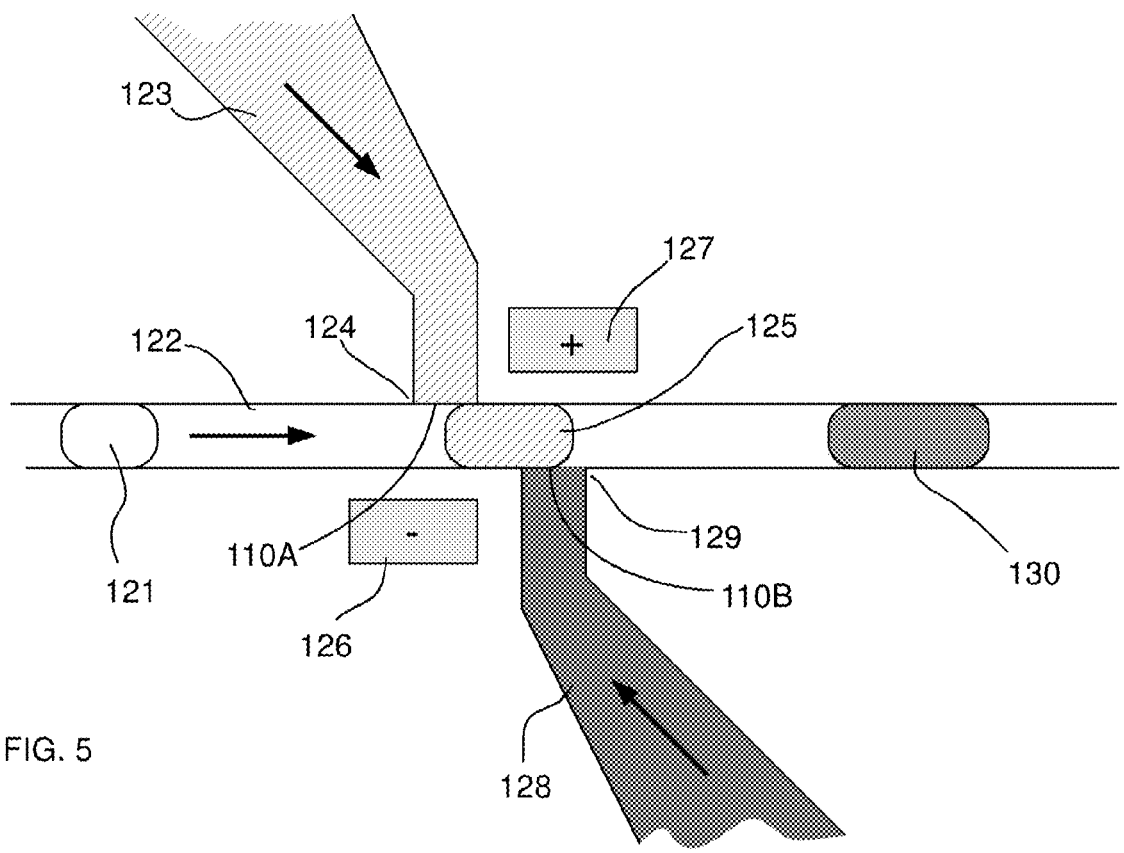
FIG. 5 is an illustration of an example of another embodiment of a system for performing injection of multiple substantially controlled volumes into or out of a droplet, according to the present invention.

Referring now to FIG. 5, wherein an example of one embodiment of a system for performing injection of multiple substantially controlled volumes into or out of a droplet, according to the present invention, is illustrated. In this example, the system 140 comprises a pair of electrodes 126-127 as a mechanism for disrupting the interface between a droplet and a fluid and/or emulsion. However, any of the mechanisms for disrupting the interface between a droplet and a fluid and/or emulsion described previously may be used in place of a pair of electrodes as alternative aspects or embodiments of the system illustrated in this or any other figure disclosed herein. The pair of electrodes 126-127 comprises a negative electrode 126 and a positive electrode 127, each on substantially opposite sides of a microfluidic channel 122 and in substantially diagonal orientation to one another.

The system 140 further comprises a first injection channel 123 comprising a fluid (or, alternatively, an emulsion) therein flowing in the direction indicated, and a first injection inlet 124; and a second injection channel 128 comprising a fluid (or, alternatively, an emulsion) therein flowing in the direction indicated, and a second injection inlet 129. Each injection channel 123 and 128 comprises an injection inlet (124 and 129, respectively) connected to the microfluidic channel 122 across an injection interface (first injection interface 110A and second injection interface 110B, respectively). The first injection channel 123 and second injection channel 128, together with the first injection inlet 124 and second injection inlet 129, respectively, are arranged on substantially opposite sides of the microfluidic channel 122 and in substantially diagonal orientation to one another. The first injection channel 123 is disposed substantially opposite to the negative electrode 126 and on substantially the same side of the microfluidic channel 122 as the positive electrode 127. The second injection channel 128 is disposed substantially opposite to the positive electrode 127 and on substantially the same side of the microfluidic channel 122 as the negative electrode 126. The arrangement of the components of the system 140 in the example in FIG. 5 provides for the first injection channel 123 and second injection channel 128, together with the first injection inlet 124 and second injection inlet 129, respectively, to be arranged in tighter configuration to one another.

In the example illustrated in FIG. 5, a droplet 121 is flowing through a microfluidic channel 122 in the direction indicated. As droplet 121 flows past the first injection inlet 124 of the first injection channel 123, it is first in communication solely with the first injection inlet 124 of the first injection channel 123, during which time a substantially controlled volume of fluid (or, alternatively, emulsion) begins to be injected into droplet 121. As droplet 121 continues to flow through the microfluidic channel 122, it becomes in simultaneous communication with the first injection inlet 124 of the first injection channel 123 and the second injection inlet 129 of the second injection channel 128, during which time injection of the substantially controlled volume of fluid from first injection channel 123 is completed and a substantially controlled volume of fluid (or, alternatively, emulsion) begins to be injected into droplet 121 from second injection inlet 129, forming droplet 125 as a result of this entire process. As droplet 125 continues to flow through the microfluidic channel 122, it becomes solely connected to the second injection inlet 129 of the second injection channel 128, during which time injection of the substantially controlled volume of fluid from injection inlet 129 is completed, resulting in droplet 130. The method performed by the system 140, as illustrated in this example, may be modified to provide for the alternative method of the injection of a substantially controlled volume out of at least one droplet, as described previously. Accordingly, the system 140 illustrated and described in this example is capable of performing injection of multiple substantially controlled volumes into or out of a droplet.

Figure 6:
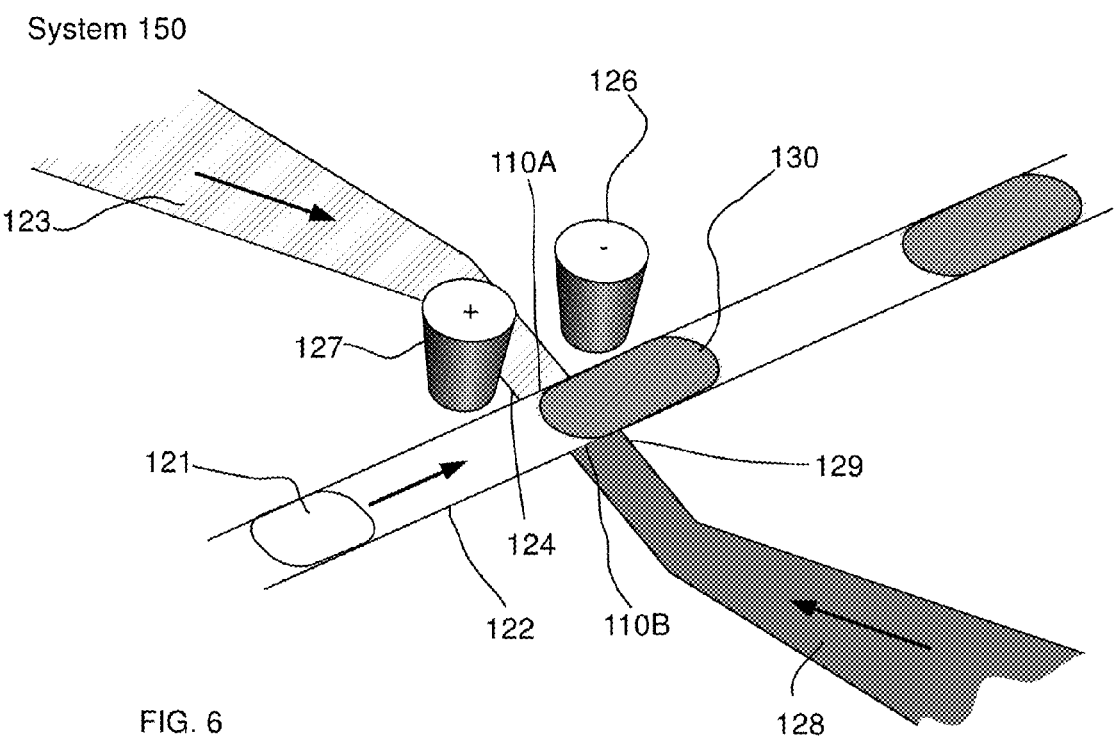
FIG. 6 is an illustration of an example of another embodiment of a system for performing injection of multiple substantially controlled volumes into or out of a droplet, according to the present invention.

Referring now to FIG. 6, wherein an example of one embodiment of a system for performing injection of multiple substantially controlled volumes into or out of a droplet, according to the present invention, is illustrated. In this example, the system 150 comprises a pair of electrodes 126-127 as a mechanism for disrupting the interface between a droplet and a fluid and/or emulsion. However, any of the mechanisms for disrupting the interface between a droplet and a fluid and/or emulsion described previously may be used in place of a pair of electrodes as alternative aspects or embodiments of the system illustrated in this or any other figure disclosed herein. The pair of electrodes 126-127 comprises a negative electrode 126 and a positive electrode 127, each on substantially the same side of a microfluidic channel 122.

The system 150 further comprises a first injection channel 123 comprising a fluid (or, alternatively, an emulsion) therein flowing in the direction indicated, and a first injection inlet 124; and a second injection channel 128 comprising a fluid (or, alternatively, an emulsion) therein flowing in the direction indicated, and a second injection inlet 129. Each injection channel 123 and 128 comprises an injection inlet (124 and 129, respectively) connected to the microfluidic channel 122 across an injection interface (first injection interface 110A and second injection interface 110B, respectively). The first injection channel 123 and second injection channel 128, together with first injection inlet 124 and second injection inlet 129, respectively, are arranged on substantially opposite sides of the microfluidic channel 122 and substantially opposite to one another.

The arrangement of the components of the system 150 in the example illustrated in FIG. 6 provides for substantially simultaneous injection of multiple substantially controlled volumes into a droplet. As droplet 121 flows through the microfluidic channel 122 in the direction indicated, the first injection inlet 124 and second injection inlet 129 communicate substantially simultaneously with the droplet 121, resulting in droplet 130. The method performed by the system 150, as illustrated in this example, may be modified to provide for the alternative method of the injection of a substantially controlled volume out of at least one droplet, as described previously. Accordingly, the system 150 illustrated and described in this example is capable of performing injection of multiple substantially controlled volumes into or out of a droplet.

Figure 7:
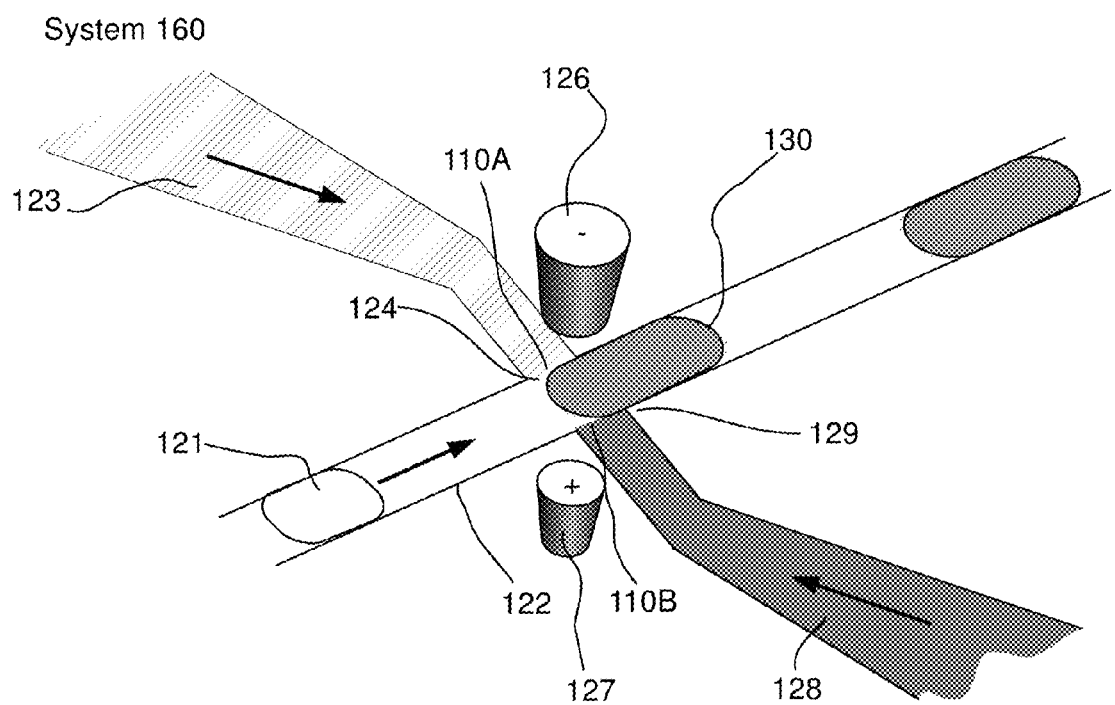
FIG. 7 is an illustration of an example of another embodiment of a system for performing injection of multiple substantially controlled volumes into or out of a droplet, according to the present invention.

FIG. 7 illustrates an alternative embodiment of the system illustrated in FIG. 6, wherein the electrodes of the pair of electrodes 126-127 are arranged on substantially opposite sides of a microfluidic channel 122 and in substantially diagonal orientation to each other. The method performed by the system 160, as illustrated in this example, may be modified to provide for the alternative method of the injection of a substantially controlled volume out of at least one droplet, as described previously. Accordingly, the system 160 illustrated and described in this example is capable of performing injection of multiple substantially controlled volumes into or out of a droplet.

Figure 8:
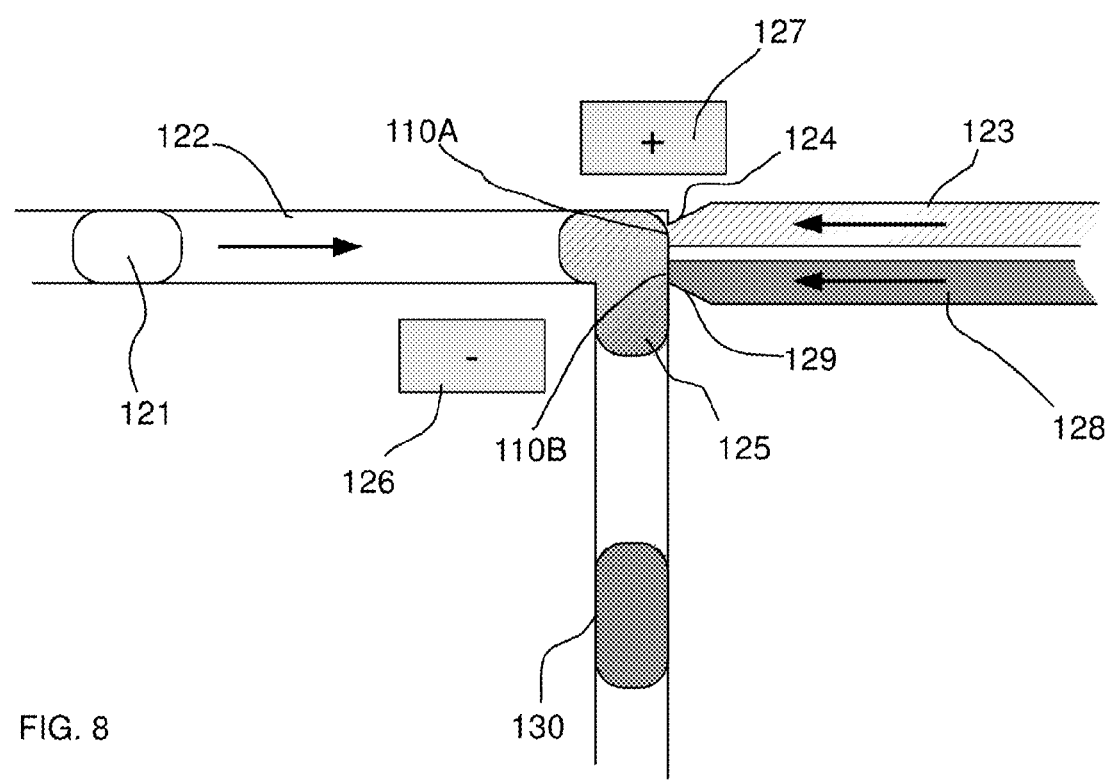
FIG. 8 is an illustration of an example of another embodiment of a system for performing injection of multiple substantially controlled volumes into or out of a droplet, according to the present invention.

Referring now to FIG. 8, wherein an example of one embodiment of a system for performing injection of multiple substantially controlled volumes into or out of a droplet, according to the present invention, is illustrated. In this example, the system 170 comprises a pair of electrodes 126-127 as a mechanism for disrupting the interface between a droplet and a fluid and/or emulsion. However, any of the mechanisms for disrupting the interface between a droplet and a fluid and/or emulsion described previously may be used in place of a pair of electrodes as alternative aspects or embodiments of the system illustrated in this or any other figure disclosed herein. The pair of electrodes 126-127 comprises a negative electrode 126 and a positive electrode 127, each on substantially opposite sides of a microfluidic channel 122 and in substantially diagonal orientation to each other.

The system 170 further comprises a first injection channel 123 comprising a fluid (or, alternatively, an emulsion) therein flowing in the direction indicated, and a first injection inlet 124; and a second injection channel 128 comprising a fluid (or, alternatively, an emulsion) therein flowing in the direction indicated, and a second injection inlet 129. Each injection channel 123 and 128 comprises an injection inlet (124 and 129, respectively) connected to the microfluidic channel 122 across an injection interface (first injection interface 110A and second injection interface 110B, respectively). The first injection channel 123 and second injection channel 128, together with the first injection inlet 124 and second injection inlet 129, respectively, are disposed on substantially the same side of the microfluidic channel 122 and are arranged substantially parallel to each other.

In the example illustrated in FIG. 8, a droplet 121 is flowing through a microfluidic channel 122 in the direction indicated, with injection of substantially controlled volumes into the droplet taking place as previously described in FIG. 5. The method performed by the system 170, as illustrated in this example, may be modified to provide for the alternative method of the injection of a substantially controlled volume out of at least one droplet, as described previously. Accordingly, the system 170 illustrated and described in this example is capable of performing injection of multiple substantially controlled volumes into or out of a droplet.

Figure 9:
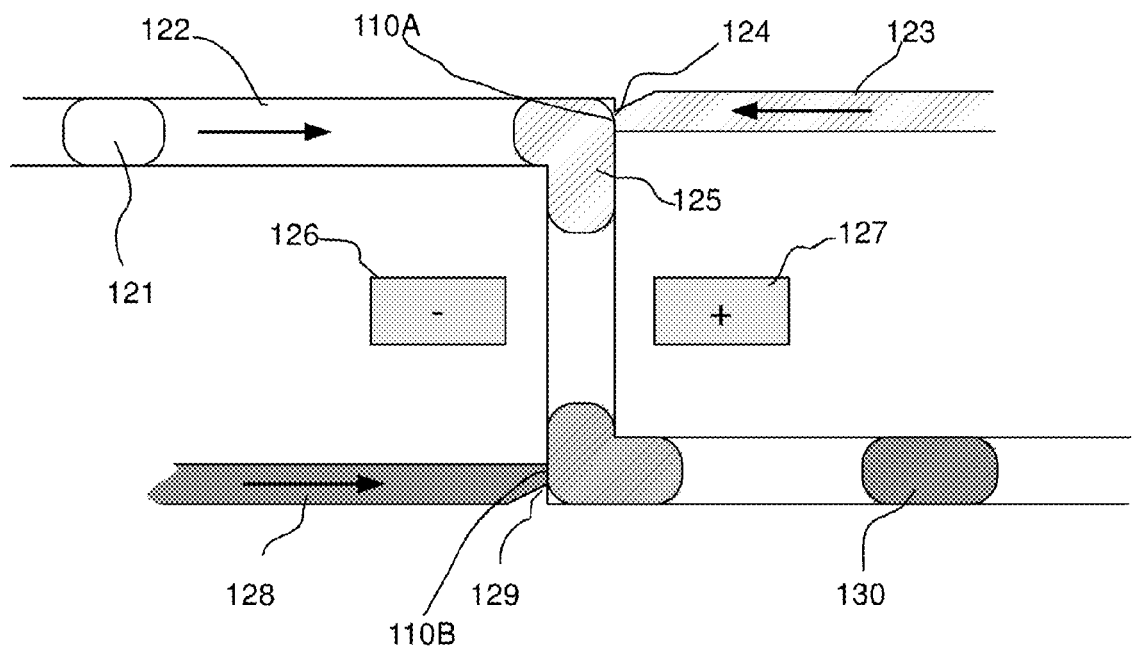
FIG. 9 is an illustration of an example of the three dimensional structure of an embodiment of the system for performing injection of multiple substantially controlled volumes into or out of a droplet, according to the present invention.

Referring now to FIG. 9, wherein an example of one embodiment of a system for performing injection of multiple substantially controlled volumes into or out of a droplet, according to the present invention, is illustrated. In this example, the system 180 comprises a pair of electrodes 126-127 as a mechanism for disrupting the interface between a droplet and a fluid and/or emulsion. However, any of the mechanisms for disrupting the interface between a droplet and a fluid and/or emulsion described previously may be used in place of a pair of electrodes as alternative aspects or embodiments of the system illustrated in this or any other figure disclosed herein. The pair of electrodes 126-127 comprises a negative electrode 126 and a positive electrode 127 substantially opposed to each other and on substantially opposite sides of a microfluidic channel 122.

The system 180 further comprises a first injection channel 123 comprising a fluid (or, alternatively, an emulsion) therein flowing in the direction indicated, and a first injection inlet 124; and a second injection channel 128 comprising a fluid (or, alternatively, an emulsion) therein flowing in the direction indicated, and a second injection inlet 129. Each injection channel 123 and 128 comprises an injection inlet (124 and 129, respectively) connected to the microfluidic channel 122 across an injection interface (first injection interface 110A and second injection interface 110B, respectively). The first injection channel 123 and second injection channel 128, together with first injection inlet 124 and second injection inlet 129, respectively, are arranged on substantially opposite sides of the microfluidic channel 122 and substantially parallel to one another.

In this example illustrated in FIG. 9, a droplet 121 is flowing through a microfluidic channel 122 in the direction indicated. As droplet 121 flows past first injection inlet 124 of first injection channel 123, a substantially controlled volume of fluid is injected into droplet 121, resulting in droplet 125. As droplet 125 flows past the second injection inlet 129 of the second injection channel 128, a substantially controlled volume of fluid is injected into droplet 125, resulting in droplet 130. The method performed by the system 180, as illustrated in this example, may be modified to provide for the alternative method of the injection of a substantially controlled volume out of at least one droplet, as described previously. Accordingly, the system 180 illustrated and described in this example is capable of performing injection of multiple substantially controlled volumes into or out of a droplet.

Figure 10:
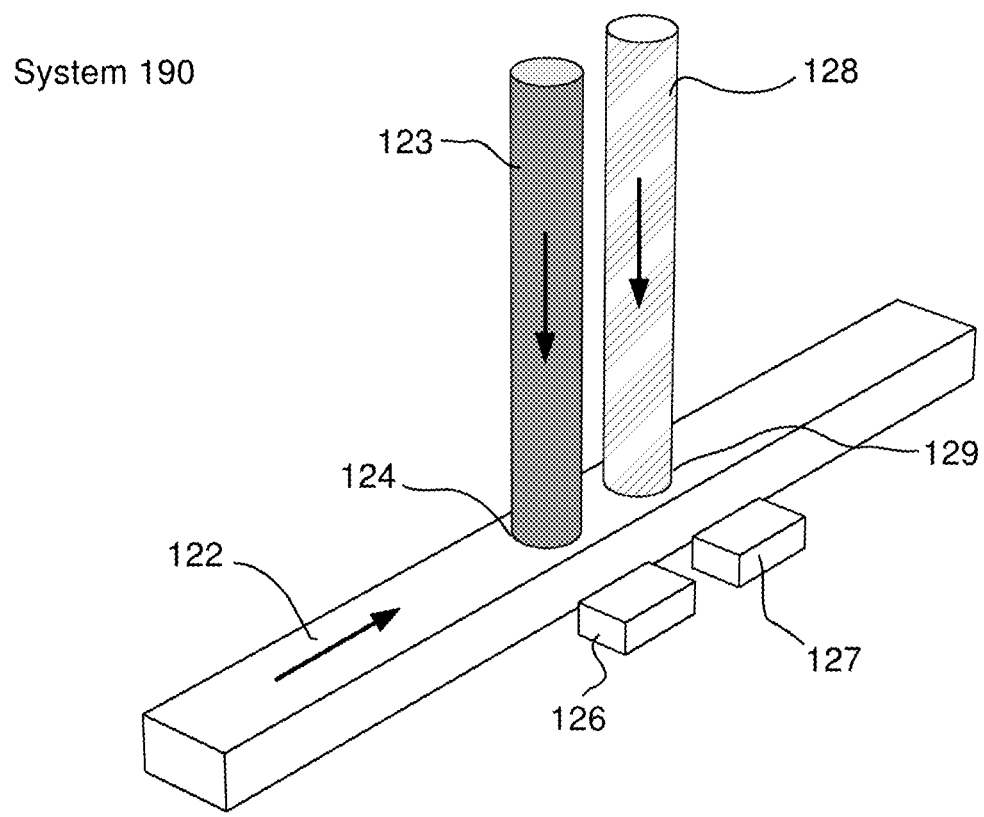
FIG. 10 is an illustration of an example of another embodiment of a system for performing injection of multiple substantially controlled volumes into or out of a droplet, according to the present invention.

Referring now to FIG. 10, the purpose of which is to provide a three dimensional type of illustration of an embodiment of the system for performing injection of multiple controlled volumes into or out of droplets, according to the present invention. In this example, the system 190 comprises a microfluidic channel 122 providing for the flow of droplets in the direction shown. The system 190 further comprises a pair of electrodes 126-127 disposed on substantially the same side of the microfluidic channel 122. The system 190 further comprises a first injection channel 123 comprising a fluid (or, alternatively, an emulsion) flowing therein in the direction shown and a first injection inlet 124 connected to the microfluidic channel 122. The system 190 further comprises a second injection channel 128 comprising a fluid (or, alternatively, an emulsion) flowing therein in the direction shown and a second injection inlet 129 connected to the microfluidic channel 122. The method performed by the system 190, as illustrated in this example, may be modified to provide for the alternative method of the injection of a substantially controlled volume out of at least one droplet, as described previously. Accordingly, the system 190 illustrated and described in this example is capable of performing injection of multiple substantially controlled volumes into or out of a droplet.

Figure 11:
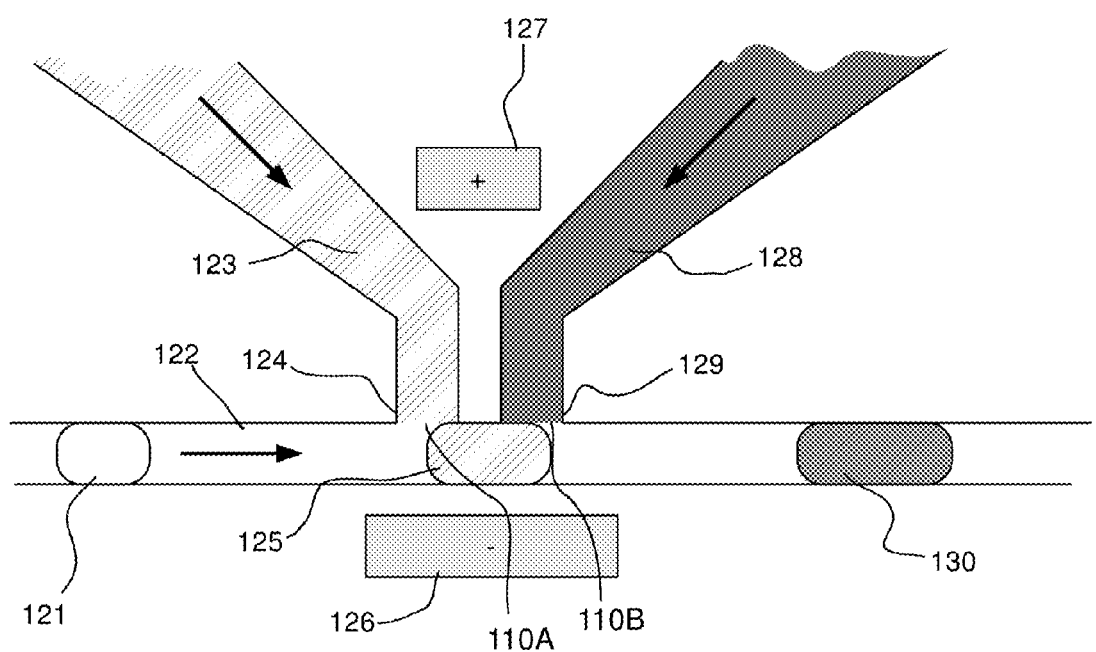
FIG. 11 is an illustration of an example of another embodiment of a system for performing injection of multiple substantially controlled volumes into or out of a droplet, according to the present invention.

Referring now to FIG. 11, which is an illustration of an example of one embodiment of a system for performing injection of multiple controlled volumes into or out of droplets, according to the present invention. The system 200 in this example is substantially identical to that depicted in FIG. 4 but with the injection channels 123 and 128 and the injection inlets 124 and 129 arranged in relatively tighter configuration to each other and wherein the electrodes 126-127 are configured such that the field lines of the resulting electric field cross the first injection interface 110A and second injection interface 110B. The method performed by the system 200, as illustrated in this example, may be modified to provide for the alternative method of the injection of a substantially controlled volume out of at least one droplet, as described previously. Accordingly, the system 200 illustrated and described in this example is capable of performing injection of multiple substantially controlled volumes into or out of a droplet.

Figure 12:
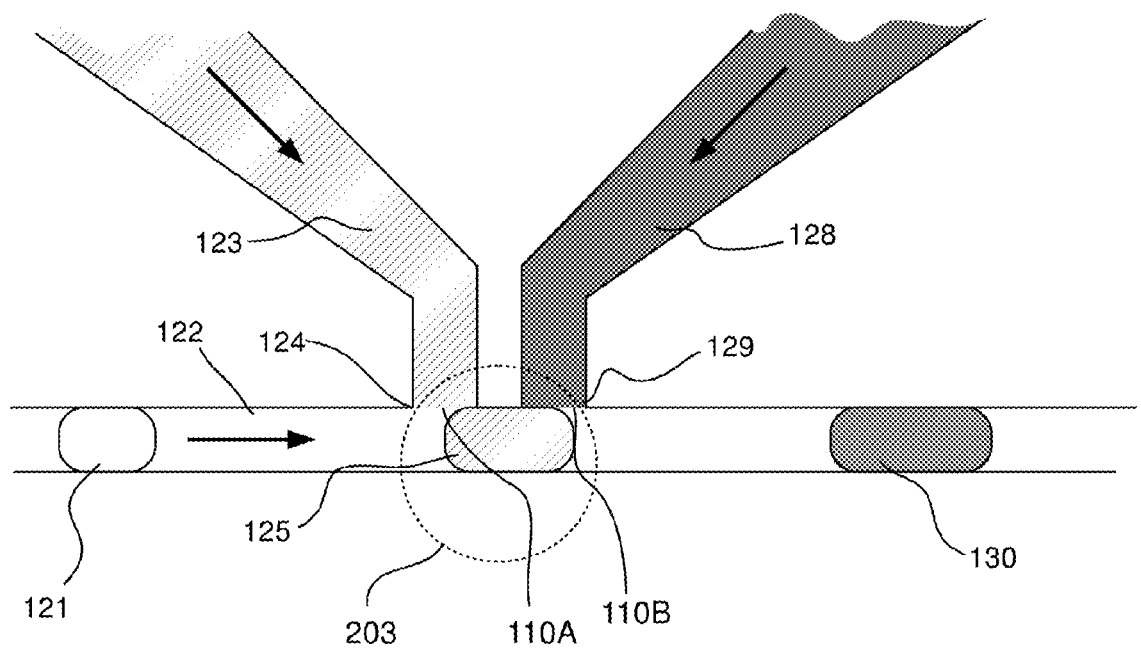
FIG. 12 is an illustration of an example of another embodiment of a system for performing injection of multiple substantially controlled volumes into or out of a droplet, according to the present invention.

Referring now to FIG. 12, which is an illustration of an example of one embodiment of a system for performing injection of multiple controlled volumes into or out of a droplet, according to the present invention. The system 202 in this example is substantially identical to those depicted in FIGS. 4 and 11, but employs a laser, rather than a pair of electrodes, as an alternative mechanism for disrupting the interface between a droplet and a fluid and/or emulsion, as previously described. In this example, the laser (not shown) may be focused in the form of a "laser spot" 203 on a region of the microfluidic channel 122 encompassing the region of the first injection interface 110A and the second injection interface 110B. The laser spot 203 as illustrated in FIG. 12 is not intended to convey a particular size and may be of any size, larger or smaller than as illustrated. The resulting spatial variation in temperature around the laser spot 203 will promote spatial imbalance of droplet surface tension, resulting in a thermocapillary effect on and, hence, destabilizing of, the interface between the droplet and the fluid and/or emulsion and further providing the energy required for injection of a substantially controlled volume into or out of a droplet. The method performed by the system 202, as illustrated in this example, may be modified to provide for the alternative method of the injection of a substantially controlled volume out of at least one droplet, as described previously. Accordingly, the system 202 illustrated and described in this example is capable of performing injection of multiple substantially controlled volumes into or out of a droplet.

Figure 13:
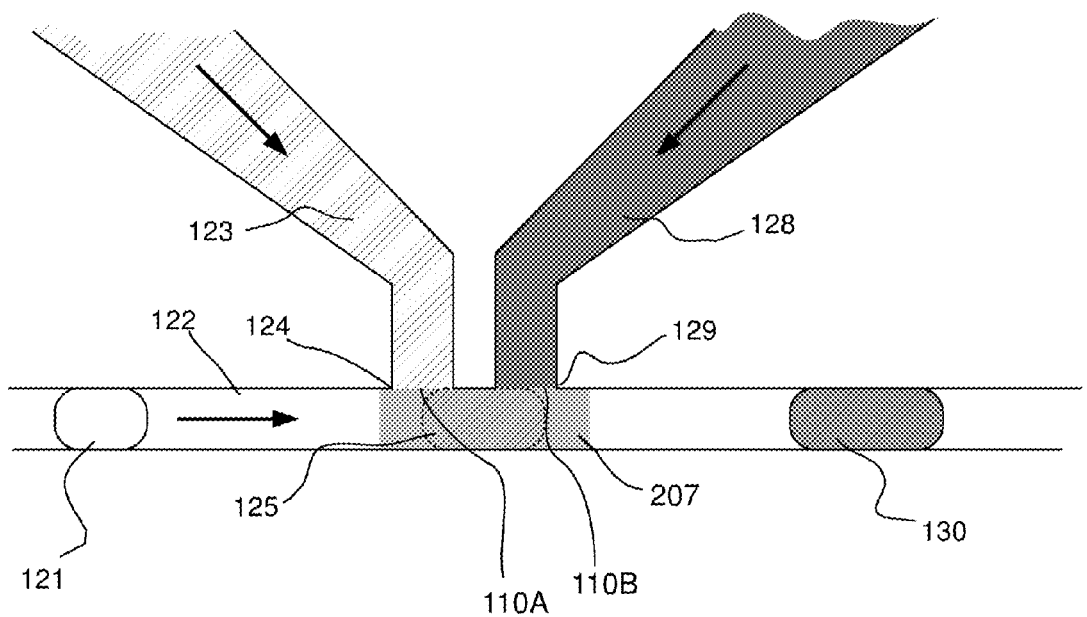
FIG. 13 is an illustration of an example of another embodiment of a system for performing injection of multiple substantially controlled volumes into or out of a droplet, according to the present invention.

Referring now to FIG. 13, which is an illustration of an example of one embodiment of a system for performing injection of multiple controlled volumes into or out of droplets, according to the present invention. The system 206 in this example is substantially identical to those depicted in FIGS. 4 and 11, but employs a localized hydrophilic region 207 within the microfluidic channel 122, rather than a pair of electrodes as in FIGS. 4 and 11, as an alternative mechanism for disrupting the interface between a droplet and a fluid and/or emulsion.

In this example, the microfluidic channel 122 comprises substantially hydrophobic walls to prevent wetting of droplets and promote the presence of a thin layer of the continuous phase between the droplets and surface of the microfluidic channel 122. However, the microfluidic channel 122 in this example further comprises a localized hydrophilic region 207 to promote wetting of droplets as they flow pass this localized hydrophilic region 207, resulting in disruption of the previously stable interface between a droplet and a fluid and/or emulsion. Accordingly, as droplet 121 encounters each of the first injection interface 110A and the second injection interface 110B, the previously stable interface is disrupted between droplet 121 and each fluid (or, alternatively, an emulsion) in each of the first injection channel 123 and the second injection channel 128, facilitating injection of substantially controlled volumes as the droplet 121 passes by the first injection inlet 124 and the second injection inlet 129, resulting in droplets 125 and 130, respectively. The localized hydrophilic region 207, as illustrated in FIG. 13, is not intended to convey a particular size and may be of any size, larger or smaller than as illustrated. Once any particular droplet flows past this localized hydrophilic region, the continuous phase will naturally re-wet the microfluidic channel wall and, thus, promote reformation and stabilization of the interface between the particular droplet and the fluid and/or emulsion. The method performed by the system 206, as illustrated in this example, may be modified to provide for the alternative method of the injection of a substantially controlled volume out of at least one droplet, as described previously. Accordingly, the system 206 illustrated and described in this example is capable of performing injection of multiple substantially controlled volumes into or out of a droplet.

Figure 14:
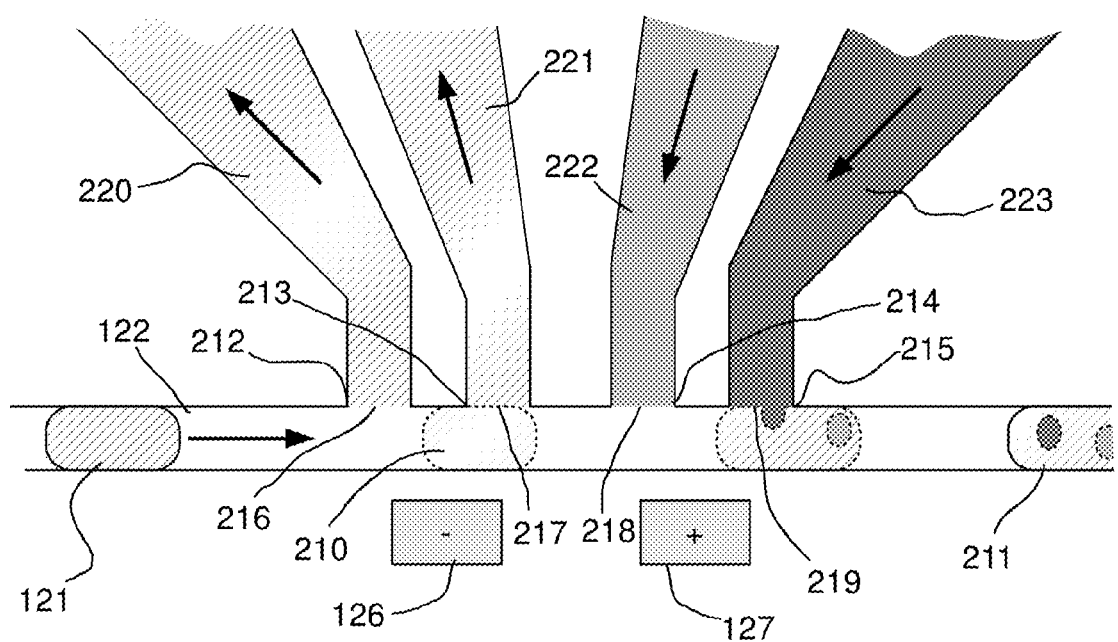
FIG. 14 is an illustration of an example of another embodiment of a system for performing injection of multiple substantially controlled volumes into or out of a droplet, more specifically illustrating the dual directionality of injection, according to the present invention.

Referring now to FIG. 14, which is an illustration of an example of another embodiment of a system for performing injection of multiple substantially controlled volumes into or out of a droplet, more specifically illustrating the dual directionality of injection, according to the present invention. In this example, the system 208 comprises a pair of electrodes 126-127 as a mechanism for disrupting the interface between a droplet and a fluid and/or emulsion. However, any of the mechanisms for disrupting the interface between a droplet and a fluid and/or emulsion described previously may be used in place of a pair of electrodes as alternative aspects or embodiments of the system illustrated in this or any other figure disclosed herein. The pair of electrodes 126-127 comprises a negative electrode 126 and a positive electrode 127, each on substantially the same side of a microfluidic channel 122.

The system 208 further comprises a first injection channel 220 comprising a fluid (or, alternatively, an emulsion) therein flowing in the direction indicated, and a first injection inlet 212; a second injection channel 221 comprising a fluid (or, alternatively, an emulsion) therein flowing in the direction indicated, and a second injection inlet 213; a third injection channel 222 comprising a fluid (or, alternatively, an emulsion) therein flowing in the direction indicated, and a third injection inlet 214; and a fourth injection channel 223 comprising a fluid (or, alternatively, an emulsion) therein flowing in the direction indicted, and a fourth injection inlet 215. Each injection channel 220-223 comprises an injection inlet (212-215, respectively) connected to the microfluidic channel 122 across an injection interface (first injection interface 216, second injection interface 217, third injection interface 218, and fourth injection interface 219, respectively). The injection channels 220-223 are disposed on substantially the same side of the microfluidic channel 122, and the injection inlets 212-215 are is connected to the microfluidic channel 122.

In the example illustrated in FIG. 14, a droplet 121 is flowing through a microfluidic channel 122 in the direction indicated. As droplet 121 flows past the first injection inlet 212 of the first injection channel 220, a substantially controlled volume of fluid is injected out of droplet 121, resulting in droplet 210. As droplet 210 flows past the second injection inlet 213 of the second injection channel 221, a substantially controlled volume of fluid is injected out of droplet 210, wherein said droplet proceeds to flow past the third injection inlet 214 of the third injection channel 222, during which time a substantially controlled volume is injected into the droplet, and wherein the droplet further proceeds to flow past the fourth injection inlet 215 of the fourth injection channel 223, during which time a substantially controlled volume is injected into the droplet, resulting in droplet 211. The shape and design characteristics of the injected volumes are used in FIG. 14 solely to illustrate the differentiation of the individual injected volumes from the original content of the droplet, as after injection of a substantially controlled volume into a droplet, practically or substantially no partition or boundary exists between the droplet and the injected volume. Accordingly, the system 208 illustrated and described in this example is capable of performing injection of multiple substantially controlled volumes into or out of a droplet.

Figure 15:
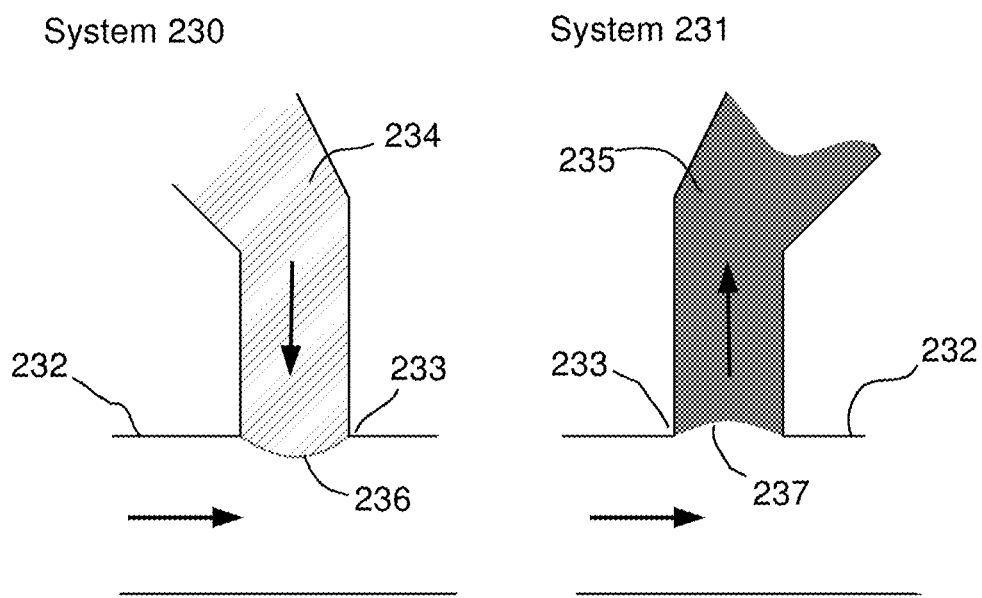
FIG. 15 is an illustration of examples of two systems, according to the present invention, demonstrating how there is no net negative or positive flow into or out of an injection channel when there is no droplet present at an injection interface or there is no mechanism present for disruption of the interface between a droplet and a fluid and/or emulsion.

In the example illustrated in FIG. 15, two systems are illustrated to demonstrate how, when there is no droplet in direct contact with an injection interface, or in instances where there is a droplet in direct contact with an injection interface but there is no mechanism for disrupting the interface between the droplet and a fluid and/or emulsion, there is substantially no net positive or net negative flow of volume into or out of the droplet or into or out of an injection channel because the forces pushing volume out of an injection channel and into the droplet are substantially balanced by the forces pushing volume out of the droplet and into the injection channel.

In system 230, an injection channel 234 comprises a fluid (as illustrated in this example but may comprise an emulsion as discussed previously) that may be injected via an injection inlet 233 into droplets flowing in the microfluidic channel 232. However, as this example illustrates, no droplets are flowing in the microfluidic channel 232 and, therefore, no fluid is being injected or is dripping into the microfluidic channel, as a result of the balancing of the forces described immediately above and previously, wherein the forces pushing volume out of the injection channel 234 are substantially balanced by the forces pushing volume into the injection channel 234. In such instances, there may or may not be bulging at the injection interface 236. It should be noted that no mechanism for disrupting the interface between a droplet and a fluid and/or emulsion is illustrated in the system 230 in this example in order to illustrate the additional point that the same balancing of forces would occur in such instances. Accordingly, the system 230 of the present invention is constructed to substantially prevent dripping of fluid and/or emulsion from the injection channel into the microfluidic channel when there is no droplet in direct contact with an injection interface or when there is no active mechanism for disrupting the interface between the droplet and the fluid and/or emulsion.

In system 231 illustrated in FIG. 15, an injection channel 235 comprises a fluid (as illustrated in this example but may comprise an emulsion as discussed previously) that may result from injection via injection inlet 233 out of droplets flowing in a microfluidic channel 232. However, as this example illustrates, no droplets are flowing in the microfluidic channel 232 and, therefore, no fluid is being injected or is dripping into the injection channel 235, as a result of the balancing of the forces described immediately above and previously, wherein the forces pushing volume into the injection channel 234 are substantially balanced by the forces pushing volume out of the injection channel 235. In such instances, there may or may not be bulging at the injection interface 237. It should be noted that no mechanism for disrupting the interface between a droplet and a fluid and/or emulsion is illustrated in the system 231 in this example in order to illustrate the additional point that the same balancing of forces would occur in such instances. Accordingly, the system 231 of the present invention is constructed to substantially prevent dripping of fluid and/or emulsion from the injection channel into the microfluidic channel when there is no droplet in direct contact with an injection interface, or when there is no active mechanism for disrupting the interface between a droplet that is in direct contact and the fluid and/or emulsion.

In another embodiment of the system according to the present invention, the droplets are present within an emulsion. In yet another embodiment of the system according to the present invention, the droplets are present within an emulsion in a microfluidic device. In still another embodiment of the present invention, the system comprises multiple microfluidic channels associated with multiple injection channels, wherein the system is contained within a microfluidic device.

Another embodiment of the present invention pertains to a method for performing injection of multiple substantially controlled volumes into or out of a droplet comprising the systems described above.

Another embodiment of the present invention pertains to a kit containing the system and reagents necessary for performing injection of multiple substantially controlled volumes into or out of a droplet, as described above.

Although the present invention and its advantages have been described in detail, it should be understood that various changes, substitutions and alterations can be made herein without departing from the spirit and scope of the invention as defined in the appended claims.

The present invention will be further illustrated in the following Examples which are given for illustration purposes only and are not intended to limit the invention in any way.

EXAMPLES

Example 1

This example demonstrates the injection of two substantially controlled volumes into droplets using a system according to the present invention. The fluorescent dyes Fluorescein and Rhodamine B, referred to as Dye 1 and Dye 2, respectively, and emitting light in the form of fluorescence at different wavelengths (525 nm and 610 nm, respectively), were injected into droplets comprising a water-in-oil emulsion. The droplets were collected after injection of both Dye 1 and Dye 2, and then passed into a microfluidic device where they flowed sequentially through a microfluidic channel, spaced by oil, wherein the microfluidic channel was sufficiently narrow such that the droplets passed through single-file. A laser beam was used to excite the droplets according to their absorption spectrum, and the intensity of the fluorescence in both the Dye 1 and Dye 2 spectrum was detected by a photomultiplier tube (PMT) system equipped with filters corresponding to the emission peaks of the dyes. A total of approximately 1000 droplets were analyzed.

Figure 16A:
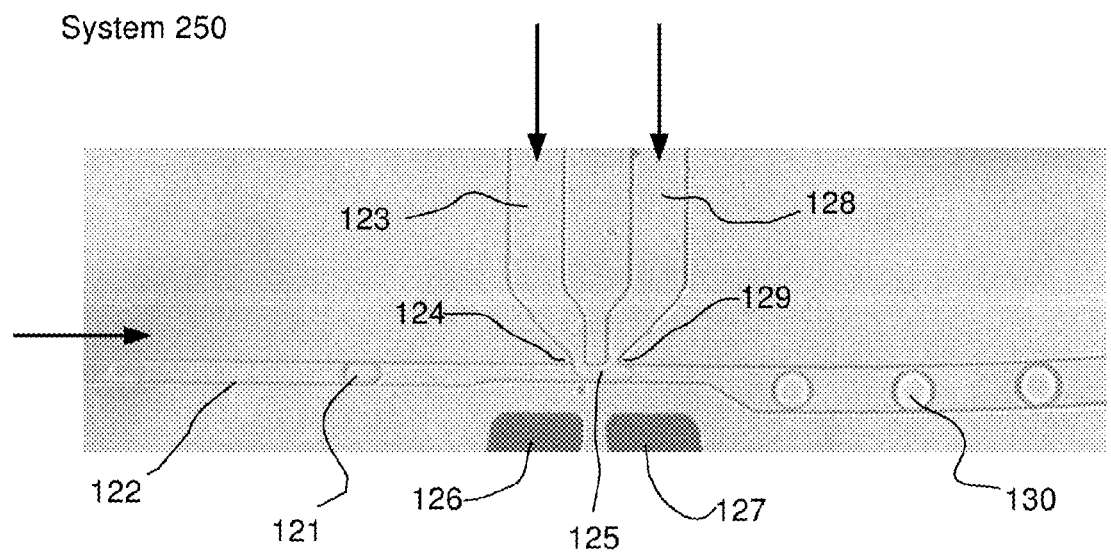
FIG. 16A is a brightfield image of an example of another embodiment of a system for performing injection of multiple substantially controlled volumes into or out of a droplet, according to the present invention.

FIG. 16A illustrates the operation of system 210 in this example, wherein the system 210 comprises a first injection channel 123 comprising a fluid and/or emulsion comprising Dye 1 contained therein, and a first injection inlet 124; and a second injection channel 128 comprising a fluid and/or emulsion comprising Dye 2 contained therein, and a second injection inlet 129. The injection channels 123 and 128, together with respective injection inlets 124 and 129, are arranged on substantially the same side of a microfluidic channel 122.

The system 210 further comprises a pair of electrodes 126-127 as a mechanism for disrupting the interface between a droplet and a fluid and/or emulsion. However, any of the mechanisms for disrupting the interface between a droplet and a fluid and/or emulsion described previously may be used in place of a pair of electrodes as alternative aspects or embodiments of the system illustrated in this example. The pair of electrodes 126-127 comprises a negative electrode 126 and a positive electrode 127, each on substantially the same side of a microfluidic channel 122a pair of electrodes comprising a negative electrode 126 and a positive electrode 127 on substantially the same side of the microfluidic channel 122 as each other and substantially opposite to the injection channels 123 and 128 and their respective injection inlets 124 and 129.

As droplet 121 flows past the first injection inlet 124 of the first injection channel 123, a substantially controlled volume comprising Dye 1 is injected into droplet 121, resulting in droplet 125. As droplet 125 flows past the second injection inlet 129 of the second injection channel 128, a substantially controlled volume comprising Dye 2 is injected into droplet 125, resulting in droplet 130.

Figure 16B:
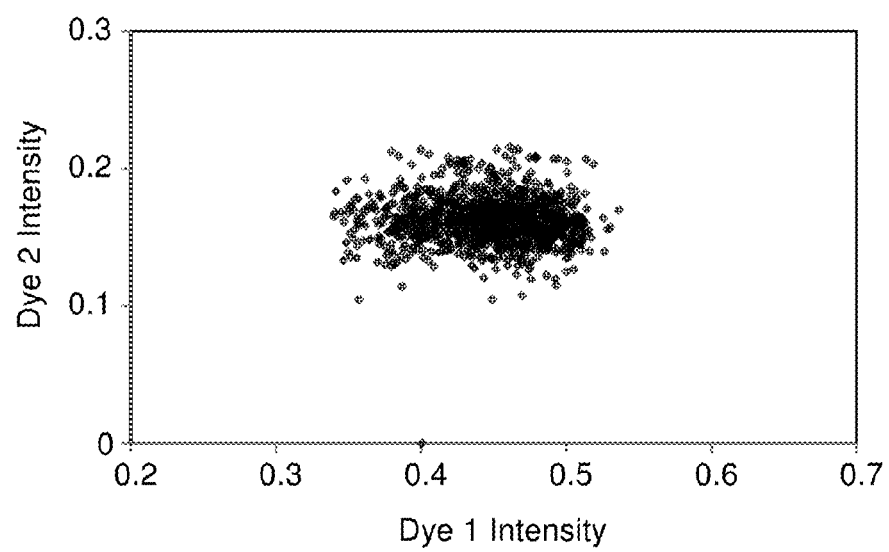
FIG. 16B is a plot of the data obtained from operation of the system of FIG. 16A.
Figure 16C:
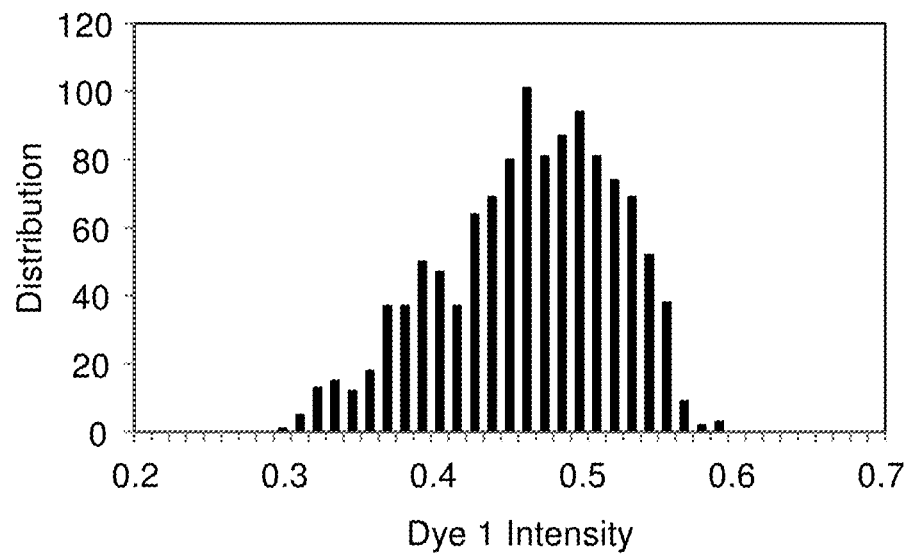
FIG. 16C is a graph illustrating the same data obtained for Dye 1 in histogram form.
Figure 16D:
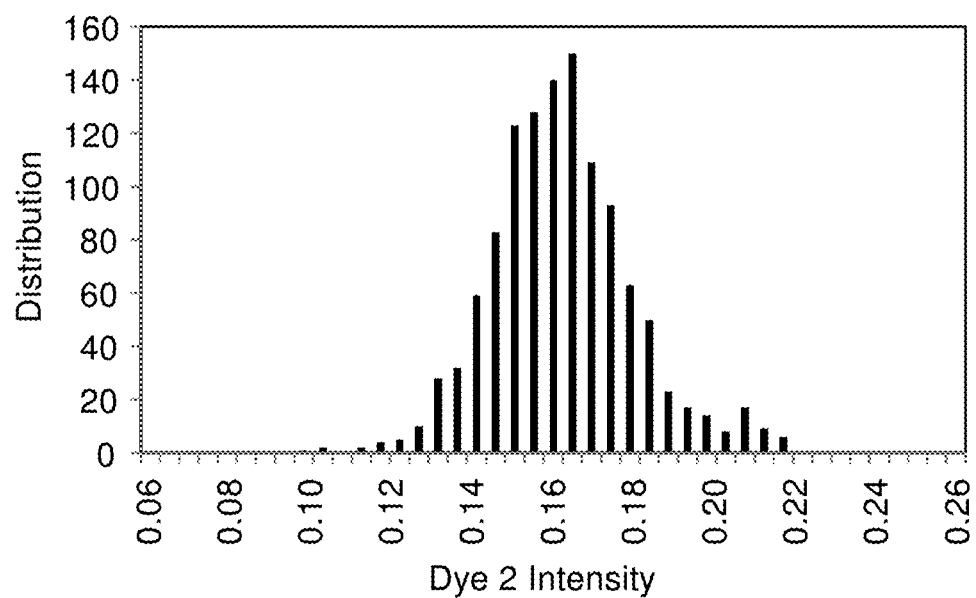
FIG. 16D is a graph illustrating the same data obtained for Dye 2 in histogram form.

FIG. 16B is a plot of the fluorescent intensity data obtained from operation of the system of FIG. 16A. The plot shows intensities in absolute units for each dye. FIG. 16C is a graph illustrating the same data obtained for Dye 1, in histogram form, showing distribution of intensity. FIG. 16D is a graph illustrating the same data obtained for Dye 2, in histogram form, showing distribution of intensity.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A system for injecting multiple volumes into droplets, comprising
   at least one microfluidic channel intersected by two or more injection channels, wherein each injection channel forms an injection inlet at an injection interface where each injection channel intersects the microfluidic channel, wherein the microfluidic channel and injection interfaces are configured such that droplets within the microfluidic channel can be flowed from a first location to a second location in the microfluidic channel past the injection interfaces and
   one single pair of electrodes positioned to disrupt interfaces between droplets and a fluid and/or emulsion at the injection inlets of the two or more injection channels,
   wherein the at least one microfluidic channel comprises one or more droplets flowing therein, and wherein each of the two or more injection channels comprises at least one fluid and/or emulsion therein.

2. A system according to claim 1, wherein one or more of the two or more injection channels further comprise one or more subchannels.

3. A system according to claim 2, wherein the one or more subchannels comprises a fluid and/or emulsion therein.

4. The system of claim 1, wherein the pair of electrodes has a first electrode and a second electrode and the first electrode and second electrode are on one side of the microfluidic channel and injection interfaces are on a substantially opposite side of the microfluidic channel.

5. The system of claim 1, wherein the pair of electrodes has a first electrode and a second electrode, and wherein the first electrode and a first injection interface are on one side of the microfluidic channel and the second electrode and a second injection interface are on a substantially opposite side of the microfluidic channel.

6. The system of claim 1, wherein the pair of electrodes has a first electrode and a second electrode, and wherein the first electrode and second electrode and a first injection interface are on one side of the microfluidic channel and a second injection interface is on a substantially opposite side of the microfluidic channel.

7. The system of claim 1, wherein the pair of electrodes has a first electrode and a second electrode and the microfluidic channel comprises a bend, wherein the first electrode is on one side of the microfluidic channel and the second electrode and a first injection interface and a second injection interface are on a substantially opposite side of the microfluidic channel, and wherein the first injection interface and a second injection interfaces are located substantially at the bend in the microfluidic channel.

8. The system of claim 1, wherein the pair of electrodes has a first electrode and a second electrode and the microfluidic channel comprises a first bend and a second bend, wherein the first electrode is on one side of the microfluidic channel and the second electrode is on a substantially opposite side of the microfluidic channel between the first bend and the second bend and a first injection interface is located substantially at the first bend and a second injection interface is located substantially at the second bend.

\* \* \* \* \*